United States Patent [19]
Weber et al.

[11] Patent Number: 5,808,798
[45] Date of Patent: Sep. 15, 1998

[54] NONPOLARIZING BEAMSPLITTER

[75] Inventors: Michael F. Weber, Shoreview; Andrew J. Ouderkirk, Woodbury; Carl A. Stover, St. Paul; James M. Jonza, Shoreview, all of Minn.

[73] Assignee: Minnesota Mining and Manufacturing Co., St. Paul, Minn.

[21] Appl. No.: 623,342

[22] Filed: Mar. 27, 1996

[51] Int. Cl.$^6$ ................................................. G02B 1/10
[52] U.S. Cl. ........................... 359/583; 359/629; 359/900
[58] Field of Search .................................. 359/583, 500, 359/495, 494, 629, 584, 900

[56] References Cited

U.S. PATENT DOCUMENTS

| | | | |
|---|---|---|---|
| Re. 34,605 | 5/1994 | Schrenk et al. | 359/359 |
| 2,441,049 | 5/1948 | West | 359/500 |
| 3,610,729 | 10/1971 | Rogers | 359/583 |
| 3,647,612 | 3/1972 | Schrenk et al. | 161/165 |
| 3,711,176 | 1/1973 | Alfrey, Jr. et al. | 359/359 |
| 3,759,647 | 9/1973 | Schrenk et al. | 425/131 |
| 3,773,882 | 11/1973 | Schrenk | 264/171 |
| 3,801,429 | 4/1974 | Schrenk et al. | 161/181 |
| 4,094,947 | 6/1978 | Alfrey, Jr. et al. | 264/171 |
| 4,310,584 | 1/1982 | Cooper et al. | 428/212 |
| 4,446,305 | 5/1984 | Rogers et al. | 528/348 |
| 4,520,189 | 5/1985 | Rogers et al. | 528/331 |

(List continued on next page.)

FOREIGN PATENT DOCUMENTS

| | | | |
|---|---|---|---|
| 1327286 | 3/1994 | Canada | G02B 6/00 |
| 062751 | 10/1982 | European Pat. Off. | G02B 1/08 |
| 469732 | 2/1992 | European Pat. Off. | G29B 1/04 |
| 514223 | 11/1992 | European Pat. Off. | G02B 5/08 |
| 33 24 059 A1 | 1/1985 | Germany | G02B 5/28 |
| 1-99004 | 4/1989 | Japan | 359/629 |
| 5-288910 | 11/1993 | Japan | G02B 5/18 |
| 6-11607 | 1/1994 | Japan | G02B 5/18 |
| WO 91/09719 | 7/1991 | WIPO | B32B 5/30 |
| WO 94/10589 | 5/1994 | WIPO | G02B 1/10 |
| WO 95/17303 | 6/1995 | WIPO | B32B 7/02 |
| WO 95/17691 | 6/1995 | WIPO | G02B 5/30 |
| WO 95/17692 | 6/1995 | WIPO | G02B 5/30 |
| WO 95/17699 | 6/1995 | WIPO | G02F 1/1335 |

OTHER PUBLICATIONS

Schrenk, W. et al., "Coextruded Elastomeric Optical Interference Film", SPE Annual Technical Conference, Atlanta, GA pp. 1703–1707 (1988).

Schrenk, W. et al., "Coextruded Infrared Reflecting Films", $7^{th}$ Annual Meeting Polymer Processing Society, Hamilton, Ontario, Canada, pp. 222–223 (Apr. 1991).

Schrenk, W. et al., "Coextruded Iridescent Film", TAPPI Paper Synthetics Conference, Atlanta, Georgia, pp. 141–145 (Sep. 27–29 1976).

(List continued on next page.)

Primary Examiner—Paul M. Dzierzynski
Assistant Examiner—John Juba, Jr.
Attorney, Agent, or Firm—William D. Miller

[57] ABSTRACT

A nonpolarizing beamsplitter is provided, which includes a multilayered stack of alternating layers of a first material and a second material. The first material layers are uniaxially birefringent, and the second material layers are optionally uniaxially birefringent or isotropic. The layers have index of refraction relationships such that for an incident beam having a useful bandwidth, a p-polarized component and an s-polarized component striking the beamsplitter at any angle of incidence θ within a desired range, the beamsplitter exhibits substantially the same average reflectivity for the p-polarized component of the incident beam as for the s-polarized component. The invention also includes a method of making a nonpolarizing beamsplitter.

35 Claims, 7 Drawing Sheets

U.S. PATENT DOCUMENTS

| | | | |
|---|---|---|---|
| 4,521,588 | 6/1985 | Rogers et al. | 528/363 |
| 4,525,413 | 6/1985 | Rogers et al. | 359/500 |
| 4,540,623 | 9/1985 | Im et al. | 428/220 |
| 4,796,978 | 1/1989 | Tanaka et al. | 359/247 |
| 4,937,134 | 6/1990 | Schrenk et al. | 428/213 |
| 5,089,318 | 2/1992 | Shetty et al. | 428/212 |
| 5,094,788 | 3/1992 | Schrenk et al. | 264/171 |
| 5,094,793 | 3/1992 | Schrenk et al. | 264/171 |
| 5,095,210 | 3/1992 | Wheatley et al. | 250/339 |
| 5,103,337 | 4/1992 | Schrenk et al. | 359/359 |
| 5,122,905 | 6/1992 | Wheatley, et al. | 359/500 |
| 5,122,906 | 6/1992 | Wheatley | 359/586 |
| 5,126,880 | 6/1992 | Wheatley et al. | 359/587 |
| 5,149,578 | 9/1992 | Wheatley et al. | 428/213 |
| 5,202,074 | 4/1993 | Schrenk et al. | 264/241 |
| 5,217,794 | 6/1993 | Schrenk et al. | 428/220 |
| 5,233,465 | 8/1993 | Wheatley et al. | 359/359 |
| 5,234,729 | 8/1993 | Wheatley et al. | 428/30 |
| 5,269,995 | 12/1993 | Ramanathan et al. | 264/171 |
| 5,278,694 | 1/1994 | Wheatley et al. | 359/359 |
| 5,316,703 | 5/1994 | Schrenk | 264/1.3 |
| 5,339,198 | 8/1994 | Wheatley et al. | 359/359 |
| 5,360,659 | 11/1994 | Arends et al. | 428/216 |
| 5,377,040 | 12/1994 | Naganuma | 359/495 |
| 5,389,324 | 2/1995 | Lewis et al. | 264/171 |
| 5,400,179 | 3/1995 | Ito | 359/588 |
| 5,424,119 | 6/1995 | Phillips et al. | 428/328 |
| 5,448,404 | 9/1995 | Schrenk et al. | 359/584 |
| 5,451,449 | 9/1995 | Shetty et al. | 428/195 |
| 5,486,949 | 1/1996 | Shrenk et al. | 359/500 |
| 5,540,978 | 7/1996 | Schrenk | 428/212 |
| 5,552,927 | 9/1996 | Wheatley et al. | 359/359 |
| 5,568,316 | 10/1996 | Schrenk et al. | 359/584 |

OTHER PUBLICATIONS

Im, J. et al., "Coextruded Microlayer Film and Sheet", *Journal of Plastic Film and Sheeting*, vol. 4, pp. 104–115 (Apr. 1988).

Schrenk, W. et al., "Coextruded Multilayer Polymer Films and Sheet", *Polymer Blends*, Chapt. 15, vol. 2, pp. 129–165, Academic Press, Inc. (1978).

Hodgkinson, I. et al., "Effective Principal Refractive Indices and Column Angles for Periodic Stacks of Thin Birefringent Films", *J. Opt. Soc. Am. A*, vol. 10, No. 9, pp. 2065–2071 (1993).

Zang, D. et al., "Giant Anistropies in the Dielectric Properties of Quasi–Epitaxial Crystalline Organic Semiconductor Thin Films", Univ. of So. Calif., Los Angeles, CA, pp. 1–12; reprint, *App. Phy. Lett.*, vol. 59, No. 7, pp. 823–825 (1991).

Schrenk et al., "Interfacial Flow Instability in Multilayer Coextrusion", *Polymer Engineering and Science*, vol. 18(8), pp. 620–623 (Jun. 1978).

Schrenk, W., "New Developments in Coextrusion", International Conference on Advances In Polymer Processing, New Orleans, Louisiana, (Apr. 1991).

Alfrey, Jr. et al., "Physical Optics of Iridescent Multilayered Plastic Films", *Polymer Engineering and Science*, , vol. 9, No. 6, pp. 400–404 (Nov. 1969).

Radford et al., "Reflectivity of Iridescent Coextruded Multilayered Plastic Films", Reflectivity of Iridescent Coextruded Multilayered Plastic Films, *Polymer Engineering and Science*, vol. 13, No. 3, (May 1973); Dow Chemical Co., American Chemical Society Symposium on Coextruded Plastic Films, Fibers, Composites, Apr. 9–14, 1972.

NONPOLARIZING BEAMSPLITTER

FIELD OF THE INVENTION

The present invention relates to a nonpolarizing beamsplitter comprising an optical multilayered stack.

BACKGROUND OF THE INVENTION

Beamsplitters are widely used in optical systems to split a single optical beam into two paths. Optical systems may include image scanning and processing apparatuses and optical measuring instruments such as microscopes and spectrophotometers. Beamsplitters used in optical systems are often required to have a nearly spectrally neutral and nonpolarizing response over a large bandwidth. In other words, the polarization state of the incident flux is to be preserved after it interacts with the beamsplitter. In addition, it is desirable for color systems to maintain sharp band edges upon color separation in order to maintain the color purity and resolution of the image-forming beam.

Beamsplitters for optical imaging systems generally take the form of a continuous surface which is partially reflective and partially transmissive. In particular, such beamsplitters may comprise a film of multiple isotropic inorganic layers coated on a substrate, in which the layers are made of alternating materials having refractive indices designated as low (L), medium (M) and/or high (H). For example, one multilayered beamsplitter is described as having layers of three different materials arranged in a repeating pattern of (MHML) stacks (Thelen, A. 1976. Appl. Opt., vol. 15, p. 2983). However, these stacks are nonpolarizing only when placed inside a glass cube. For low cost and ease of manufacture, most nonpolarizing beamsplitters are only two-component (LH) stacks on planar substrates.

Such beamsplitters are designed by specifying 1) layer thicknesses and 2) materials having particular indices of refraction in order to achieve the desired reflectivity, bandwidth, and nonpolarizing response of the beamsplitter. The beamsplitter is generally able to be tuned to be nonpolarizing at only one angle of incidence. These beamsplitters are generally useful only for collimated light. In addition, the nonpolarizing response may be only attainable over a narrow spectral bandwidth (200 nm or less) which is not practical for broadband optical systems, such as those utilizing the entire visible spectrum. It is also difficult to produce sharp band edges with such an isotropic stack, because the wavelength positions of the band edges of reflected s- and p-polarized light are usually quite different.

SUMMARY OF THE INVENTION

The present invention provides a nonpolarizing beamsplitter which preserves the polarization state of incident light having any desired bandwidth at any angle of incidence within a desired range. The beamsplitter thus can accommodate collimated or non-collimated beams in narrowband or broadband applications. The light divided by the nonpolarizing beamsplitter of this invention exhibits sharp band edges in both its reflected and transmitted components, making the beamsplitter particularly useful in, for example, reflective color separation systems.

The nonpolarizing beamsplitter comprises a multilayered stack having two major surfaces. The multilayered stack includes alternating layers of a first material and a second material, the layers each having an x-direction and a y-direction forming an x-y plane, and a z-direction perpendicular to the x-y plane. The first material layers are uniaxially birefringent, and have an index of refraction in the x-y plane, $n_{1(x,y)}$, and an index of refraction in the z-direction, $n_{1(z)}$. The difference between these indices of refraction, $n_{1(x,y)} - n_{1(z)}$, is at least 0.05. The second material layers have an index of refraction in the x-y plane, $n_{2(x,y)}$, and an index of refraction in the z-direction, $n_{2(z)}$. The second material layers may optionally be uniaxially birefringent, or they may be isotropic. The beamsplitter exhibits index of refraction relationships such that $n_{1(x,y)}$ is greater than $n_{2(x,y)}$ ($n_{1(x,y)} > n_{2(x,y)}$) and $n_{1(z)}$ is less than or equal to $n_{2(z)}$ ($n_{1(z)} \leq n_{2(z)}$). Most preferably, $n_{1(x,y)}$ is equal to $n_{2(z)}$ ($n_{1(x,y)} = n_{2(z)}$) and $n_{2(x,y)}$ is equal to $n_{1(z)}$ ($n_{2(x,y)} = n_{1(z)}$). Preferably, the difference between $n_{1(x,y)}$ and $n_{2(x,y)}$ (designated as $\Delta n_{(x,y)}$) is at least 0.05.

The beamsplitter of this invention exhibits the following nonpolarizing response for an incident beam of light that has a useful bandwidth, a p-polarized component, and an s-polarized component: When the incident beam strikes a major surface of the beamsplitter at any angle of incidence $\theta$ within a range, the beamsplitter exhibits a reflectivity $R_p$ for the p-polarized component of the incident beam and a reflectivity $R_s$ for the s-polarized component of the incident beam such that $R_p$ and $R_s$ differ by less than 25%, preferably 10%, and more preferably 5% when surface reflections are excluded. $R_p$ and $R_s$ are average values over the useful bandwidth of the incident beam. In other words, a plotted curve of reflectivity vs. angle of incidence for p-polarized light will closely match the same curve for s-polarized light for all angles of incidence within a specified range. As used herein, "useful bandwidth" refers to that portion of the incident beam spectrum over which a nonpolarizing response is desired. The total spectrum of the incident beam may be wider than the useful bandwidth.

For the purposes of this invention, light is defined as electromagnetic radiation in the visible and infrared regions, having wavelengths in the range from about 0.3 microns ($\mu$m) to about 15 $\mu$m. The size of the bandwidth of the incident beam of light is defined as the difference between the largest and smallest wavelengths contained in the beam. The beamsplitter of this invention is suitable for use with light having many bandwidth sizes. The size of the bandwidth is at least about 25 nm for many applications, and is generally in the range from 100 to 400 nm for broadband applications. The size of the range of angle of incidence is defined as the difference between the highest and lowest values in the range. Examples of useful ranges include sizes of 15° or larger (such as the range extending from 30° to 60° and the range extending from 0° to 70°). The desired range will depend upon the constraints of the application or applications in which the beamsplitter is to be used.

The beamsplitter may further include an antireflective treatment on one or both surfaces of the multilayered stack to reduce surface reflections. The multilayered stack may also be optionally mounted on a transparent substrate.

In one embodiment, the first material is a polymer characterized by positive stress-induced birefringence, the second material is a polymer, and the stack has been biaxially stretched in the x-direction and the y-direction. The property of stress-induced birefringence in a material is defined as a change in index of refraction resulting from stress applied to the material (such as stretching). The change in index occurs in the direction along which the stress is applied. For the purposes of this invention, the change in index is permanent (i.e., does not disappear after the stress is removed). A polymer having positive stress-induced birefringence will produce upon biaxial stretching a film having negative uniaxial birefringence. The second material may exhibit positive stress-induced birefringence, negative stress-induced birefringence (the opposite of positive stress-induced birefringence), or it may exhibit no stress-induced birefringence and thus remain isotropic. The first material is preferably polyethylene naphthalate (PEN). The second material may be a semi-crystalline or amorphous polymeric material, and is preferably syndiotactic polystyrene (sPS).

In another embodiment, the beamsplitter comprises a multilayered stack in which the average of the optical thicknesses of the layers is less than 5/4 times the average wavelength of the incident beam of light (5/4λ). Preferably, each layer has an optical thickness of less than 5/4λ, and is typically near a ¼λ value. This is generally referred to as a thin film stack. Preferably, the layer thicknesses of the multilayered stack are varied so that the beamsplitter is nonpolarizing over the desired bandwidth. A computer program may be used to optimize the layer thicknesses in the stack for maximum optical performance.

In another embodiment, the beamsplitter comprises a multilayered stack in which the average of the optical thicknesses of the layers is at least 5/4 times the average wavelength of the incident beam of light (5/4λ). Preferably, each layer has an optical thickness of at least 5/4λ. This construction is generally referred to as a thick film stack. The beamsplitter preferably comprises at least 10 layers, more preferably in the range from 10 to 1000 layers.

In a particularly preferred embodiment, the nonpolarizing beamsplitter comprises a multilayered stack as described above, containing alternating layers of PEN and sPS. The PEN layers have an index of refraction in the x-y plane, $n_{1(x,y)}$, in the range from about 1.73 to about 1.77 and an index of refraction in the z-direction, $n_{1(z)}$, in the range from about 1.48 to about 1.52. The sPS layers have an index of refraction in the x-y plane, $n_{2(x,y)}$, in the range from about 1.55 to about 1.59 and an index of refraction in the z-direction, $n_{2(z)}$, in the range from about 1.60 to about 1.64. These indices of refraction are all measured at 580 nm. When an incident beam having a useful bandwidth suitable for a chosen application strikes a major surface of the beamsplitter at any angle of incidence θ in the range from about 0° to about 60° the beamsplitter exhibits average reflectivities $R_p$ and $R_s$ as described above, wherein $R_p$ and $R_s$ differ by less than 10%.

The invention further provides a method of making a nonpolarizing beamsplitter, including the steps of coextruding a multilayered sheet of alternating layers of a first material and a second material, the layers each having an x-direction and a y-direction forming an x-y plane, and a z-direction perpendicular to the x-y plane. In the multilayered sheet thus formed, the first material layers have an index of refraction in the x-y plane $n_{1(x,y)}$ and an index of refraction in the z-direction $n_{1(z)}$, and the second material layers have an index of refraction in the x-y plane $n_{2(x,y)}$ and an index of refraction in the z-direction $n_{2(z)}$. The first material is chosen to exhibit positive stress-induced birefringence. The second material may optionally exhibit stress-induced birefringence, or it may exhibit no stress-induced birefringence. The multilayered sheet is then stretched biaxially in the x-direction and the y-direction until a multilayered stack is formed having the index of refraction relationships $n_{1(x,y)} > n_{2(x,y)}$ and $n_{1(z)} \leq n_{2(z)}$. In the stack, the first material layers are uniaxially birefringent such that $n_{1(x,y)} - n_{1(z)} \geq 0.05$. The second material layers may also be uniaxially birefringent, or they may be isotropic. The resulting beamsplitter exhibits the nonpolarizing response described above.

DETAILED DESCRIPTION

Figure 1:
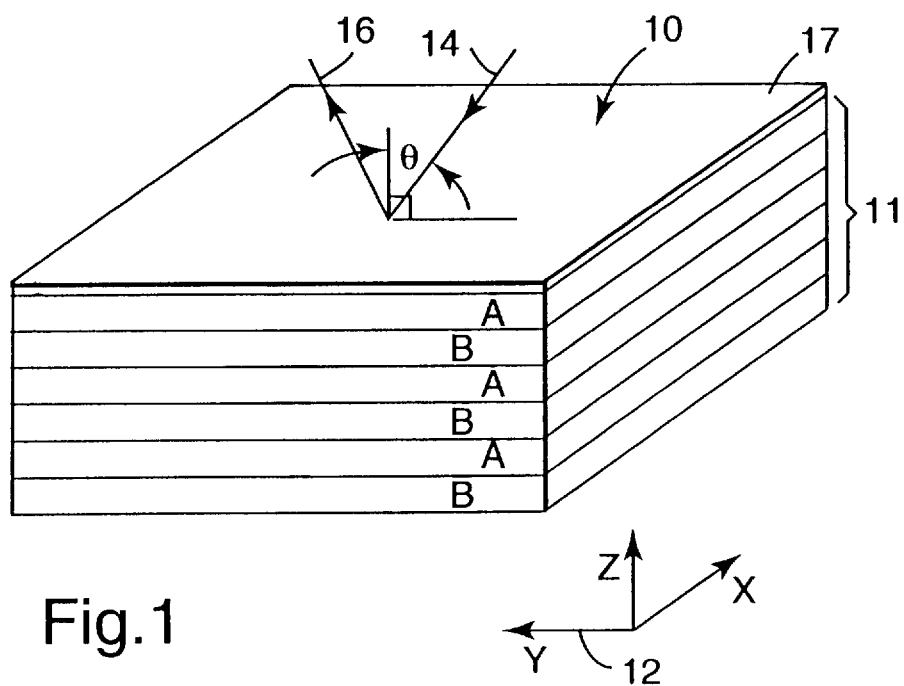
FIG. 1 is a schematic perspective view of a portion of a nonpolarizing beamsplitter of the present invention.

FIG. 1 is a schematic perspective diagram of a portion of a nonpolarizing beamsplitter 10 of this invention immersed in an isotropic medium (not shown) having an index of refraction $n_0$. The nonpolarizing beamsplitter comprises a multilayered planar stack 11 of alternating layers of a first material and a second material. The first and second materials are referred to as material "A" and material "B", respectively, in the drawing and description. The multilayered stack has two major surfaces, each parallel to the plane of the layers. The figure includes a coordinate system 12 that defines an x-direction and a y-direction, which together form an x-y plane which is parallel to the plane of the layers, and a z-direction perpendicular to the x-y plane. However, it is not necessary for the optic axes of the film to be exactly parallel to the x,y, and z coordinate axes in order to make useful articles.

Each of the layers of material A is uniaxially birefringent. The layers of material B may also be uniaxially birefringent, or they may be isotropic. The layers comprising material A have an index of refraction in the x-y plane, $n_{1(x,y)}$, and an index of refraction in the z-direction, $n_{1(z)}$. The difference between $n_{1(x,y)}$ and $n_{1(z)}$, indicating the level of birefringence in the material A layers, is at least 0.05. Correspondingly, the layers comprising material B have an index of refraction in the x-y plane, $n_{2(x,y)}$, and an index of refraction in the z-direction, $n_{2(z)}$. If the material B layers have positive uniaxial birefringence, then $n_{2(z)} - n_{2(x,y)} \geq 0.05$. In the case where the material B layers are isotropic, $n_{2(x,y)}$ is the same as $n_{2(z)}$. An isotropic material is one in which the index of refraction in any of the three dimensions differs by less than 0.01 from the index in either of the remaining two dimensions. The x-y plane indices $n_{1(x,y)}$ and $n_{2(x,y)}$ are each defined as being approximately uniform in any direction within the x-y plane, with a variation of less than about 1%. The multilayered stack described above is further characterized by index of refraction relationships such that $n_{1(x,y)}$ is greater than $n_{2(x,y)}$ ($n_{1(x,y)} > n_{2(x,y)}$) and $n_{1(z)}$ is less than or equal to $n_{2(z)}$ ($n_{1(z)} \leq n_{2(z)}$).

In FIG. 1, exemplary beam 14 which is to be divided is shown striking a major surface of nonpolarizing beamsplitter 10 at an angle of incidence θ. A portion of light beam 14 is reflected by beamsplitter 10 to form reflected beam 16. Beams 14 and 16 together form a plane of incidence. As is well known in the art, beams 14 and 16 each may comprise an s-polarized component which is linearly polarized perpendicular to the plane of incidence, and a p-polarized component which is linearly polarized parallel to the plane of incidence. Beam 14 may be unpolarized, with the s- and p-polarized components of equal magnitude, or the beam may be polarized so that the s-and p-polarized components are of unequal magnitude. The ratio of magnitudes of the s- and p-polarized components is referred to as the "polarization state" of the beam. The portion of beam 14 which is not reflected by beamsplitter 10 is either transmitted, or absorbed within the beamsplitter. "Nonpolarizing" with respect to the beamsplitter of this invention means that for an incident beam having a useful bandwidth striking a major surface of the beamsplitter at any angle of incidence θ within a desired range, the beamsplitter exhibits an average reflectivity $R_p$ for the p-polarized component of the incident beam and an average reflectivity $R_s$ for the s-polarized component of the incident beam such that $R_p$ and $R_s$ differ by less than 25%, preferably by less than 10%, more preferably by less than 5%, when surface reflections are excluded. In other words, we can say that the polarization state of the incident beam is preserved. "Reflectivity" means the fraction of the incident light flux that is reflected, given as a value in the range from 0 to 1. $R_s$ and $R_p$ are average values over the useful bandwidth of the incident beam.

The bandwidth of the incident beam will vary with the application. The useful bandwidth may be the same size as the actual bandwidth, or it may be smaller. A laser may have a bandwidth size of only a few nanometers, but in most other applications the bandwidth size is at least about 25 nm. Light having a bandwidth size in the range from 100 to 400 nm is typically found in broadband applications. The beamsplitter of this invention is useful for light having wavelengths in the infrared and visible ranges, i.e., from about 0.3 μm to about 15 μm. The range of angle of incidence (θ) over which the beamsplitter is nonpolarizing (meaning light at every angle within the range will produce a nonpolarizing response) can be the maximum range extending from 0° (normal incidence) to near 90° (grazing angle), although such a large range may not be desirable or necessary. For instance, very high angles of incidence are physically impractical when locating a beamsplitter in an optical system. In addition, the reflectance:transmission ratio of the beamsplitter does not remain constant as angle of incidence changes within the range and might stray outside of design specifications. A desirable range may therefore be smaller than the maximum size while still being large enough to provide flexibility in positioning the nonpolarizing beamsplitter in an optical system and accommodating a non-collimated beam. The size of the range of angle of incidence may be as small as 0° (indicating a single value of θ), but is preferably at least 10° so as to accommodate beams that are not highly collimated. Examples of suitable ranges include a range extending from 0° to 70°, or a smaller range extending from 30° to 60°.

A particularly useful beamsplitter of this invention is nonpolarizing for an incident beam having a bandwidth covering the visible spectrum (extending from about 400 nm to about 700 nm) and a size of the range of angle of incidence between 15° and 25°. Such a beamsplitter might have a range of angle of incidence extending from 35° to 55°, for example.

The behavior of this uniaxially birefringent stack is an improvement over that of multilayered stacks of isotropic materials (in which the indices of refraction corresponding to the x-, y- and z-directions are approximately equal). In such isotropic stacks, the reflectivity of s-polarized light is generally different from the reflectivity of p-polarized light at a given wavelength, and their reflectivities vary independently with angle of incidence. In other words, an isotropic stack will not usually preserve the polarization state of an incident beam of light and therefore does not exhibit a nonpolarizing response. In the cases where an isotropic stack is nonpolarizing, the nonpolarizing effect holds true only for a narrow range of angle of incidence.

With respect to this invention, the reflection coefficients of p- and s-polarized light ($r_{pp}$ and $r_{ss}$) at a given wavelength for a single interface between layers of material A and material B are given by Equations 1 and 2, respectively.

$$r_{pp} = \frac{n_{1(z)}n_{1(x,y)}\sqrt{n_{2(z)}^2 - n_0^2\sin^2\theta} - n_{2(z)}n_{2(x,y)}\sqrt{n_{1(z)}^2 - n_0^2\sin^2\theta}}{n_{2(z)}n_{2(x,y)}\sqrt{n_{1(z)}^2 - n_0^2\sin^2\theta} + n_{1(z)}n_{1(x,y)}\sqrt{n_{2(z)}^2 - n_0^2\sin^2\theta}} \quad (1)$$

$$r_{ss} = \frac{\sqrt{n_{1(x,y)}^2 - n_0^2\sin^2\theta} - \sqrt{n_{2(x,y)}^2 - n_0^2\sin^2\theta}}{\sqrt{n_{1(x,y)}^2 - n_0^2\sin^2\theta} + \sqrt{n_{2(x,y)}^2 - n_0^2\sin^2\theta}} \quad (2)$$

Reflectivity of each polarization, $R_p$ or $R_s$, is calculated by squaring the absolute value of the corresponding reflection coefficient. In the above equations, θ is the angle of incidence measured in an exterior isotropic medium having index $n_0$. It can be seen that Equation 2 is equivalent to the standard reflection coefficient equation for isotropic materials in that $n_{1(z)}$ and $n_{2(z)}$ do not affect the reflectivity of s-polarized light. By contrast, $n_{1(z)}$ and $n_{2(z)}$ may greatly affect the reflectivity of p-polarized light at a single interface.

Figure 2:
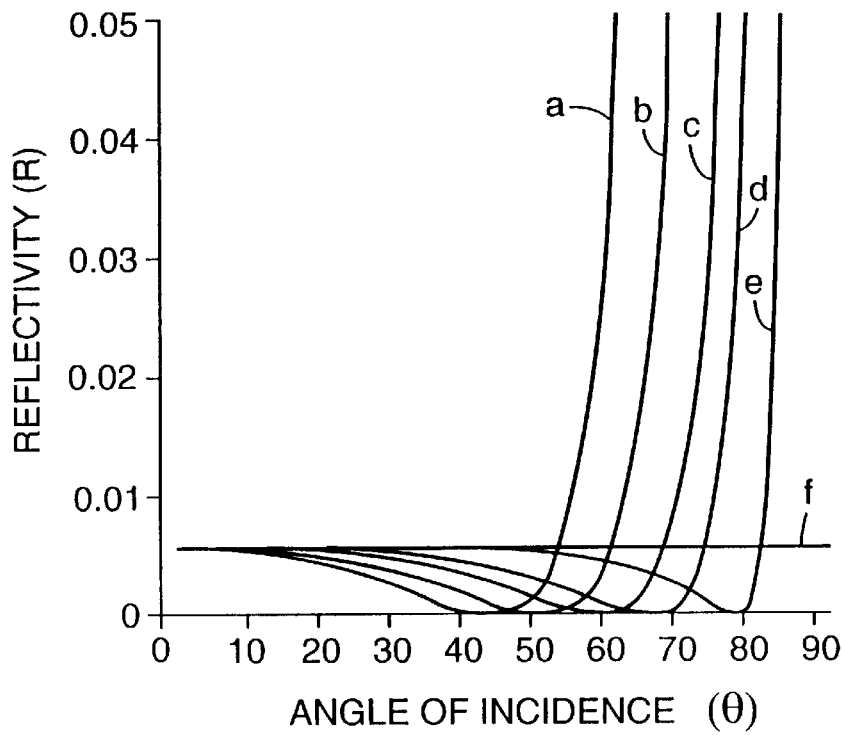
FIGS. 2 and 3 are graphical views of reflectivity vs. angle of incidence for a single interface of two materials in a medium of index 1.60.
Figure 3:
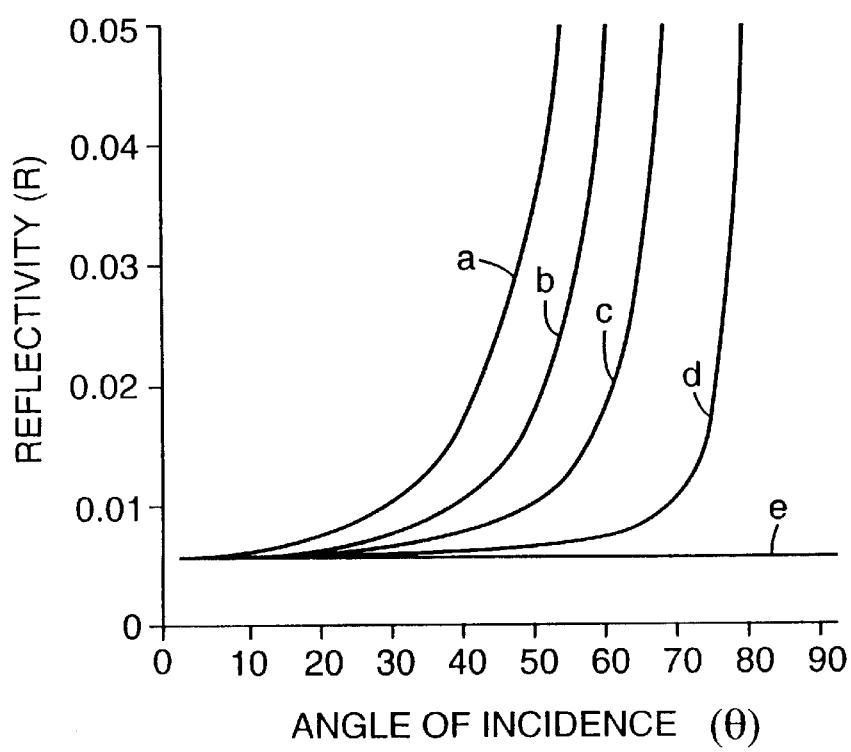

Equation 1 can be used to illustrate the effect of various index of refraction relationships on the reflectivity of p-polarized light at a single interface of a 2-layer uniaxially birefringent system as shown in the graphs of FIGS. 2 and 3. For the purposes of illustration in these figures, the indices of refraction are assigned representative values as follows: $n_{1(x,y)}=1.75$, $n_{2(x,y)}=1.50$, and the isotropic medium surrounding the system has a value $n_0=1.60$. FIG. 2 shows reflectivity vs. angle of incidence curves for p-polarized light incident from the isotropic medium to the birefringent layers, for cases in which $n_{1(z)}$ is numerically greater than or equal to $n_{2(z)}$ ($n_{1(z)} \geq n_{2(z)}$). The curves labeled (a)–(f) in FIG. 2 are for the following z-index values: (a) $n_{1(z)}=1.75$, $n_{2(z)}=1.50$; (b) $n_{1(z)}=1.75$, $n_{2(z)}=1.57$; (c) $n_{1(z)}=1.70$, $n_{2(z)}=1.60$; (d) $n_{1(z)}=1.65$, $n_{2(z)}=1.60$; (e) $n_{1(z)}=1.61$, $n_{2(z)}=1.60$; and (f) $n_{1(z)}=1.60=n_{2(z)}$. As $n_{1(z)}$ approaches $n_{2(z)}$, the Brewster angle (the angle at which reflectivity of p-polarized light goes to zero) increases. However, when $n_{1(z)}=n_{2(z)}$ (curve (f)), the Brewster angle effect disappears and there is constant reflectivity for all angles of incidence.

FIG. 3 shows reflectivity vs. angle of incidence curves for interfaces in which $n_{1(z)}$ is numerically less than or equal to $n_{2(z)}$ ($n_{1(z)} \leq n_{2(z)}$). For the sake of comparison, curve (a) represents s-polarized light and shows the characteristic shape of a curve calculated according to Equation 2. Curves (b)–(e) show p-polarized light behavior for various values of $n_{(z)}$, in the following order: (b) $n_{1(z)}=1.50$, $n_{2(z)}=1.60$; (c) $n_{1(z)}=1.55$, $n_{2(z)}=1.60$; (d) $n_{1(z)}=1.59$, $n_{2(z)}=1.60$; and (e) $n_{1(z)}=1.60=n_{2(z)}$. Again, when $n_{1(z)}=n_{2(z)}$ (curve (e)), there is no Brewster angle effect, and there is constant reflectivity for all angles of incidence. For curves (b)–(d), reflectivity of p-polarized light increases monotonically with angle of incidence. No Brewster angle minimum is observed as in FIG. 2. Instead, the curves imitate the reflectivity response of s-polarized light shown in curve (a).

Figure 4:
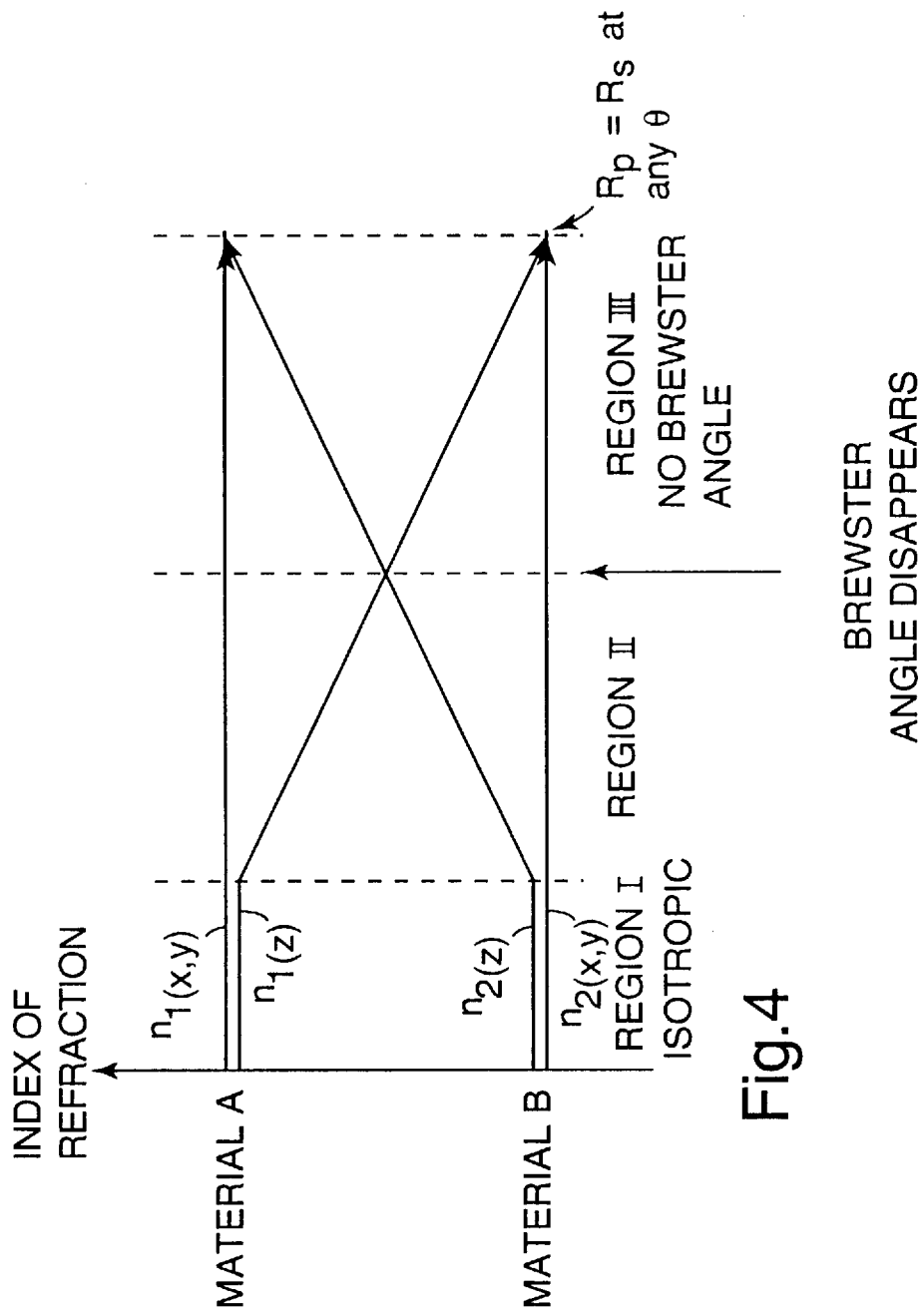
FIGS. 4 and 5 depict various possible relationships between x-y plane indices and z-direction indices for two layers of different materials.
Figure 5:
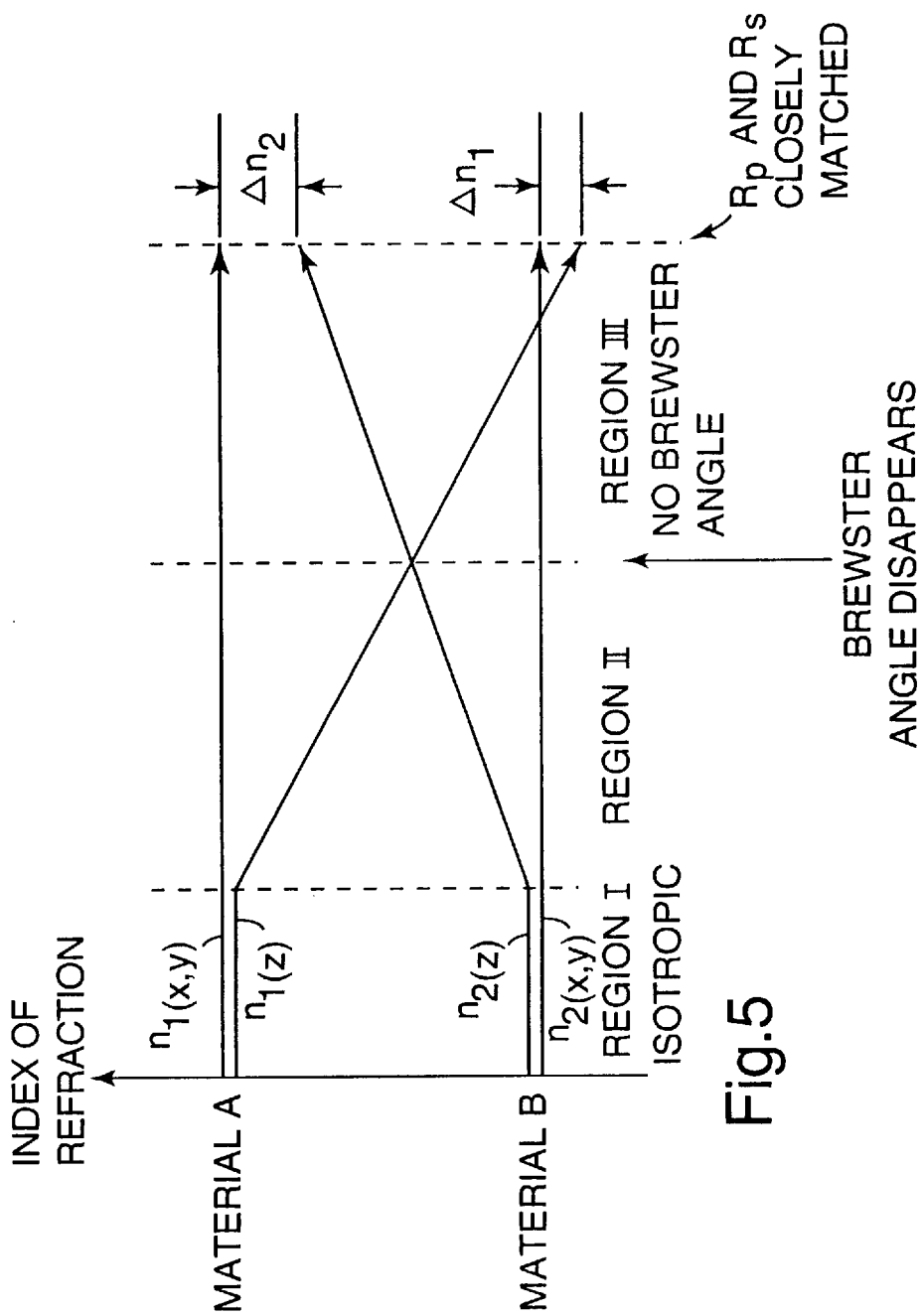

Various relationships between indices of refraction for the x-y plane and the z-direction are illustrated in FIGS. 4 and 5 for possible pairings of a material A and a material B (no single material pair will display all of the conditions illustrated). The vertical axes indicate relative values of indices of refraction and the horizontal axes are used to distinguish the responses to the various relationships. Each figure begins at the left (in Region I) with two isotropic films, where the z-direction indices and the x-y plane indices are equal (the lines are separated for clarity). As one proceeds to the right, through Regions II and III, the x-y plane indices are held constant and the z-direction indices increase or decrease, indicating the relative amount of positive or negative birefringence in the corresponding materials.

The case described above with respect to FIG. 2 is illustrated by Region II in FIGS. 4 and 5. The x-y plane indices of material A are greater than the x-y plane indices of material B. In addition, material A has negative birefringence ($n_{1(z)} < n_{1(x,y)}$), material B has positive birefringence ($n_{2(z)} > n_{2(x,y)}$), and $n_{1(z)}$ is greater than $n_{2(z)}$. The point at which the Brewster angle minimum disappears and reflectivity is constant for all angles of incidence is where $n_{1(z)}$ equals $n_{2(z)}$. This point corresponds to curve (f) in FIG. 2 and curve (e) in FIG. 3. To the right of this point, in Region III, birefringence increases for both materials A and B and $n_{1(z)}$ is now less than $n_{2(z)}$. In this region, reflectivity curves for p-polarized light will be similar to those for s-polarized light (having no Brewster angle minimum), as shown in FIG. 3. If material A is sufficiently negatively birefringent, $n_{1(z)}$ may decrease to the point where it is equal to $n_{2(x,y)}$. Likewise, if material B is sufficiently positively birefringent, $n_{2(z)}$ may increase to the point where it is equal to $n_{1(x,y)}$. This case, shown at the far right of FIG. 4, is described by Equations 3a and 3b:

$$n_{1(z)} = n_{2(x,y)} \tag{3a}$$

$$n_{2(z)} = n_{1(x,y)} \tag{3b}$$

If Equations 3a and 3b are substituted into Equation 1, and Equation 1 is combined with Equation 2, we find that $r_{pp} = r_{ss}$. Therefore, if the relationships described by Equations 3a and 3b can be met with the choice of sufficiently birefringent materials, the reflectivity of s- and p-polarized light ($R_s$ and $R_p$) will be identical for all angles of incidence. This is the optimum case of a perfect nonpolarizing response at a single interface.

It may be difficult, however, to find materials having sufficient birefringence so that $n_{1(z)}$ equals $n_{2(x,y)}$, and more particularly so that $n_{2(z)}$ equals $n_{1(x,y)}$. Materials having lesser birefringence may have to be used instead. This case is illustrated at the far right of FIG. 5 in which $n_{2(z)}$ is less than $n_{1(x,y)}$ by an amount $\Delta n_2$ and $n_{1(z)}$ is less than $n_{2(x,y)}$ by an amount $\Delta n_1$. Fortunately, there exists a range of indices of refraction over which $R_s$ and $R_p$ differ by less than 25% over a broad range of angles of incidence. In fact, $\Delta n_2$ can be larger than $\Delta n_1$ (meaning material B has less birefringence than material A) while still producing an adequate match between $R_s$ and $R_p$. The indices of refraction needed to make a nonpolarizing beamsplitter of this invention can be found empirically based on Equations 1 and 2. One first chooses a material having a relatively high birefringence and x-y plane index to be material A. With known values for $n_{1(x,y)}$ and $n_{1(z)}$ and designated values for $n_0$ and $\theta$, a contour plot of $n_{2(x,y)}$ vs. $n_{2(z)}$ is generated for the case in which Equations 1 and 2 are squared and set equal to each other ($|r_{ss}|^2 = |r_{pp}|^2$, or $R_s = R_p$). Such plots can be easily generated using commercially available mathematical software. One can then use the plot to choose a material B having desirable $n_{2(x,y)}$ and $n_{2(z)}$ values that intersect at a point on the plot.

Figure 6A:
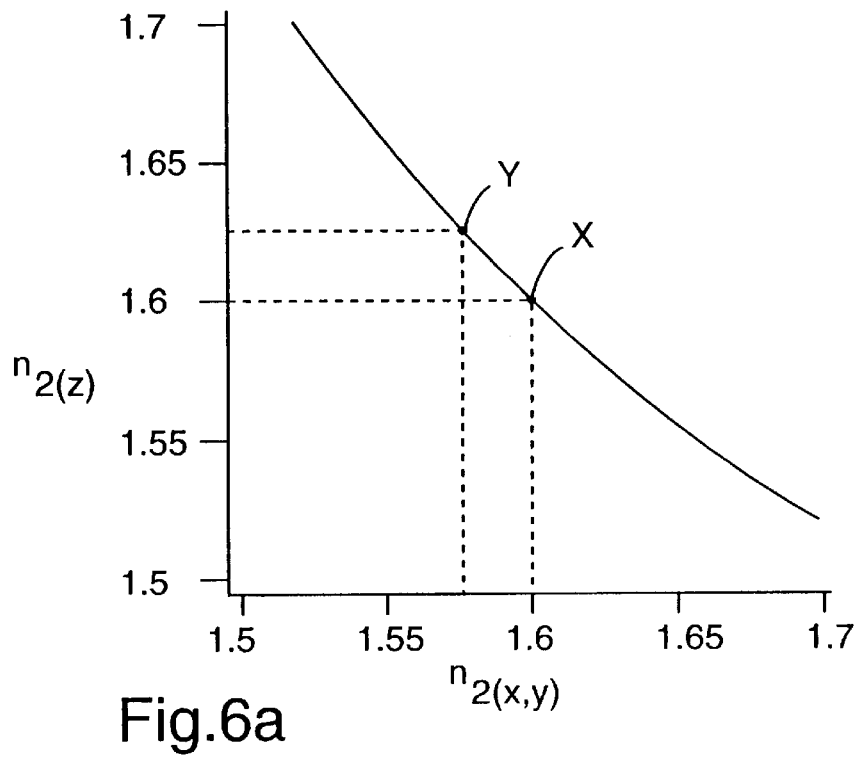
FIG. 6a is a contour plot of $n_{2(z)}$ vs. $n_{2(x,y)}$ based on Equations 1 and 2 assuming $R_s = R_p$.

An example of such a plot is shown in FIG. 6a. Material A is hypothetically chosen to be polyethylene naphthalate (PEN), and the variables are designated as follows: $n_{1(x,y)} = 1.75$, $n_{1(z)} = 1.49$, $\theta = 60°$ and $n_0 = 1.0$ (the $n_{1(x,y)}$ and $n_{1(z)}$ values are obtainable using PEN). It is evident from this plot that material B can be isotropic, with an index of about 1.60, as shown by point X on the plot. To achieve a larger index difference $\Delta n_{(x,y)}$ with respect to material A (i.e., choosing $n_{2(x,y)}$ less than that of the isotropic material), it can be seen that material B must have positive uniaxial birefringence ($n_{2(z)} > n_{2(x,y)}$) as illustrated by point Y on the plot (in which $n_{2(x,y)} = 1.58$ and $n_{2(z)} = 1.621$). These indices are very similar to those of syndiotactic polystyrene (sPS). The index $n_{2(x,y)}$ may also be chosen to be greater than that of the isotropic material, in which case material B would have negative uniaxial birefringence. The usefulness of that material would be limited, however, because a relatively high $n_{2(x,y)}$ means that the index difference $\Delta n_{(x,y)}$ is relatively small. A value of $\Delta n_{(x,y)}$ that is too small will result in the reflectivity of the interface being unacceptably low.

Figure 6B:
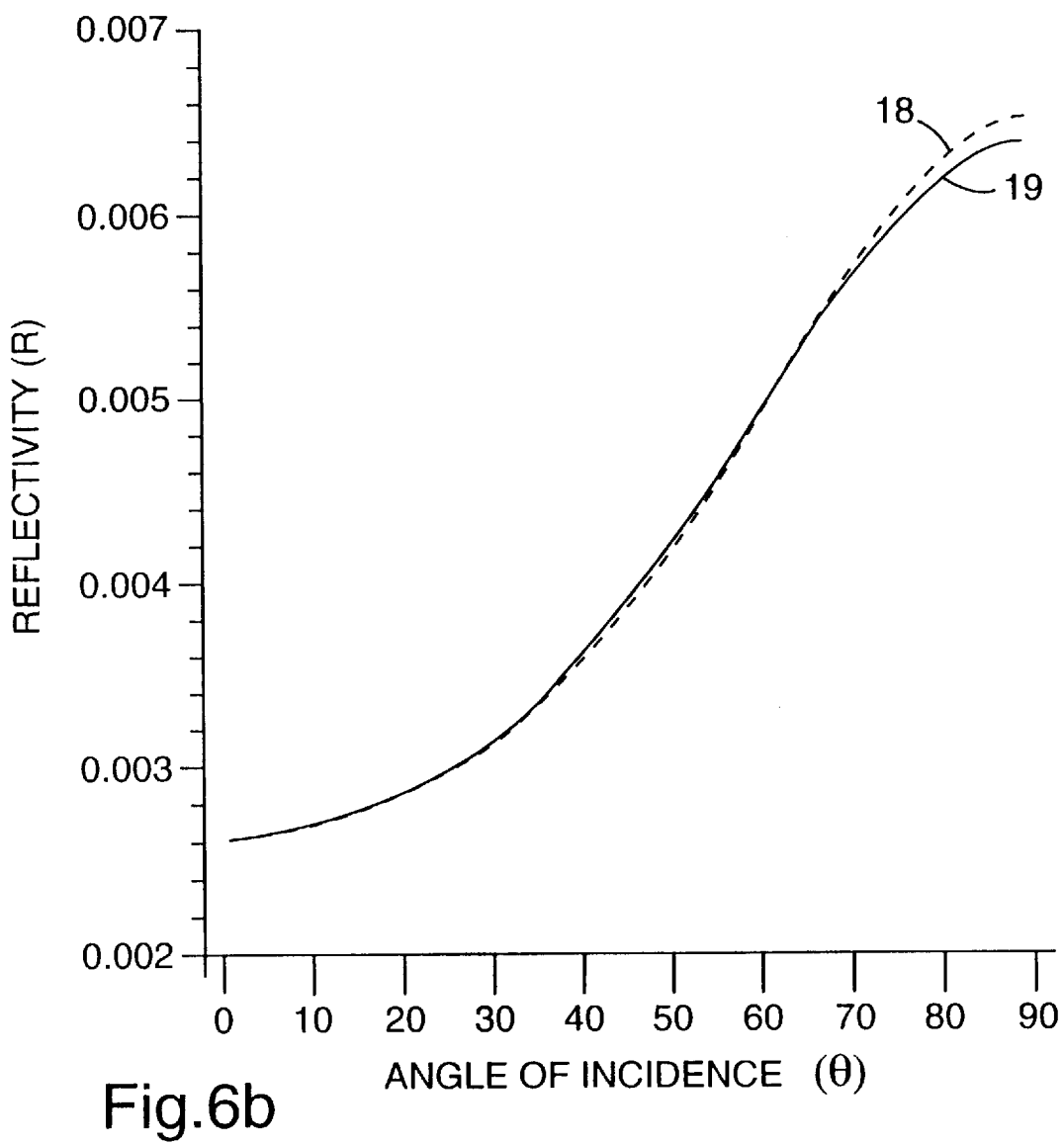
FIG. 6b is a graphical view of computed reflectivity vs. angle of incidence for s- and p-polarized light at a single interface of the material A and the material B defined by point Y in FIG. 6a in a medium of index 1.0.

Once materials A and B have been selected in the manner described above, curves can be made for reflectivities $R_s$ and $R_p$ as a function of angle of incidence ($\theta$) to determine how well the reflectivities match for a range of $\theta$ around the designated $\theta$. For instance, FIG. 6b shows reflectivity curves for an interface between material A and material B depicted by point Y in FIG. 6a in an incident medium having an index $n_0 = 1.0$. $R_p$ and $R_s$, depicted by lines 18 and 19 respectively, are equal at $\theta = 60°$, and differ by less than 2% in the range from 0° to 70°.

A change in wavelength of light will affect the nonpolarizing response of the interface. For instance, the material pair of FIG. 6b gives $R_s$ equal to $R_p$ at about 700 nm and $\theta = 60°$. At 400 nm, however, $n_{1(x,y)}$ increases so that the reflectivity curves shift and $R_s$ and $R_p$ are no longer equal. For a broadband application where $R_s$ and $R_p$ must be nearly equal over a range of wavelengths, material A may be adjusted so as to reduce $n_{1(x,y)}$ without appreciably increasing $n_{1(z)}$. For instance, the original material chosen for material A (PEN) may be blended with another material, such as PET. Alternatively, a copolymer based on naphthalene dicarboxylic acid and terephthalic acid may be prepared. In fact, material A may be formulated so that $R_s$ is equal to $R_p$ at the wavelength in the center of the band of interest, with $R_s$ slightly greater than $R_p$ at shorter wavelengths and $R_s$ slightly less than $R_p$ at longer wavelengths for a given angle of incidence.

Figure 7:
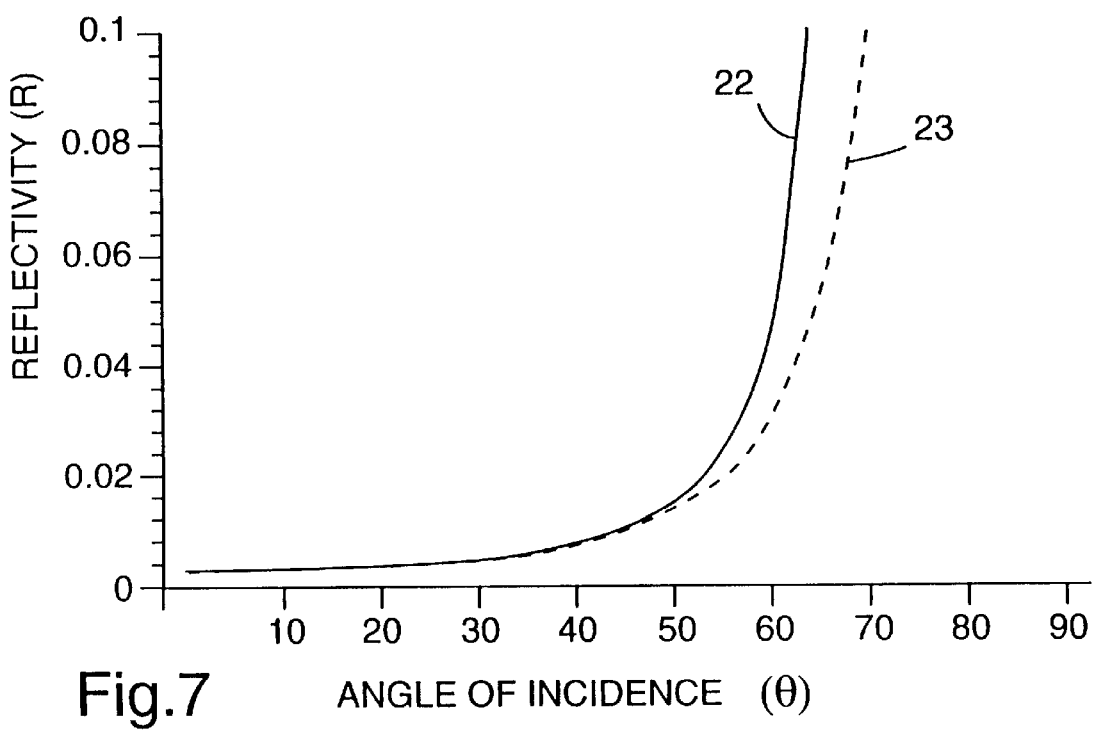
FIG. 7 is a graphical view of computed reflectivity vs. angle of incidence for s- and p-polarized light at a single interface of the material A and the material B defined by point Y in FIG. 6a in a medium of index 1.60.

The incident medium will also affect the nonpolarizing response at the interface. In FIG. 7, reflectivity vs. angle of incidence curves 22 and 23 are shown for the same material pair as in FIG. 6b, but in a higher index incident medium ($n_0 = 1.60$). It can be seen that $R_p$ (curve 22) is greater than $R_s$ (curve 23) for angles of incidence greater than about 45°.

Based on Equations 1 and 2 and the illustrations described above, we have discovered that if certain index of refraction relationships are satisfied, the reflectivity vs. angle of incidence curves for s- and p-polarized light at a single interface can be closely matched for all angles of incidence in a desired range for a given wavelength of light. By "matched" it is meant that the reflectivies $R_s$ and $R_p$ differ by less than 25%. In general, the relationships $n_{1(x,y)} > n_{2(x,y)}$ and $n_{1(z)} \leq n_{2(z)}$ must be met. Most preferably, the interface exhibits the relationships $n_{1(x,y)} = n_{2(z)}$ and $n_{2(x,y)} = n_{1(z)}$ (i.e., $\Delta n_1 = 0$ and $\Delta n_2 = 0$), resulting in a perfect nonpolarizing response at all angles of incidence. If such a perfect response cannot be achieved, useful combinations of indices can be determined using plots such as those in FIGS. 6a and 6b.

Using the data provided by Equations 1 and 2 for a single interface, we have discovered that a truly nonpolarizing beamsplitter having a plurality of such interfaces to increase overall reflectivity (in the form of a multilayered stack of alternating layers of materials A and B) can be designed using the same index of refraction relationships. The nonpolarizing response, characterized by matched reflectivity curves, will be independent of angle of incidence within a specified range of angle of incidence at a given wavelength. These reflectivity curves will shift, however, for light at different wavelengths as described with respect to FIG. 6b. If materials A and B exhibit different dispersion relationships with wavelength, then the reflectivity of s- and p-polarized light in the beamsplitter may no longer be matched. Dispersion is defined as the change in index of refraction of a material with wavelength. It is important to account for these dispersion effects, especially in broadband applications. This may be done in one way by optimizing the multilayered stack design using well known computer techniques.

The multilayered stack of FIG. 1 may optionally be attached to a transparent substrate (not shown) to provide additional rigidity or dimensional stability to the beamsplitter. The substrate may be any suitably rigid material which is nonpolarizing and optically transparent, such as glass or polycarbonate. The multilayered stack may be laminated to the substrate, adhered to the substrate using an optically inactive adhesive, mechanically affixed to the substrate, or attached using some other like method that does not interfere with the nonpolarizing response of the beamsplitter.

Because surface reflections can contribute significantly to the overall reflectivity of the beamsplitter, it is preferred that the multilayered stack of FIG. 1 have an antireflective treatment such as an antireflective coating 17 disposed on at least one major surface to reduce surface reflections. Such antireflective treatments are well known in the art and include vacuum deposited films, sol gel coatings, and surface treatments such as plasma etching.

In many applications, the nonpolarizing beamsplitter of this invention preferably acts as a partial mirror or filter, so that a portion of incident light of each polarization state is transmitted, and substantially the rest is reflected. The average transmittance for a nonpolarizing beamsplitter of this invention will depend upon the application in which the beamsplitter is used. In general, beamsplitters are designed to give a certain average transmission across a specific bandwidth. For example, a 50:50 beamsplitter of this invention designed for use in the visible spectrum (400 nm–700 nm) would provide 50% transmission and 50% reflectance over a bandwidth of 300 nm. It is important to note that the transmission:reflectance ratio of the beamsplitter will change when angle of incidence (θ) is changed, though the beamsplitter remains nonpolarizing. The amount of light absorbed by the beamsplitter is preferably less than 1%.

In one embodiment, a nonpolarizing beamsplitter comprising a multilayered stack as described above is made by forming materials A and B into a sheet having the desired number of layers, and biaxially stretching the sheet in the x-direction and the y-direction until a stack of layers is formed having the index of refraction relationships described above. The stretch ratios in the x- and y-direction are not necessarily equal, but are chosen to provide a uniform index of refraction in the x-y plane. "Stretch ratio" is defined as the dimension after stretch divided by the dimension before stretch. The stretch ratios can be chosen to adjust $n_{1(x,y)}$, $n_{2(x,y)}$, $n_{1(z)}$ and/or $n_{2(z)}$ so that the indices have the desired relationship in order to match the reflectivity vs. angle of incidence curves of the s- and p-polarized components.

In this embodiment, the multilayered sheet is stretched in the x-and y-directions so that the x-y plane index of refraction difference between adjacent layers (defined as $\Delta n_{(x,y)} = n_{1(x,y)} - n_{2(x,y)}$) is substantially the same for any axis in the x-y plane. This optical characteristic causes the multilayered stack to act as a mirror that will, for a given angle of incidence, reflect equally at any azimuthal angle about the z-axis. The index difference $\Delta n_{(x,y)}$ is at least 0.05, more preferably at least 0.1, and more preferably at least 0.15.

Material A is a polymer chosen to exhibit positive stress-induced birefringence, or increase in index of refraction in the stretch direction upon stretching. Material B is a polymer that may exhibit negative stress-induced birefringence (a decrease in index of refraction in the stretch direction upon stretching), or it may exhibit no stress-induced birefringence. Less preferably, material B may exhibit positive stress-induced birefringence, although in this case the value of $\Delta n_{(x,y)}$ will be reduced. After stretching, each of the layers comprising material A has an x-y plane index of refraction $n_{1(x,y)}$ that is greater than the index of refraction associated with the z direction, $n_{1(z)}$. The material B layers may have a z-direction index that is either greater than or less than the x-y plane index ($n_{2(z)} > n_{2(x,y)}$ or $n_{2(z)} < n_{2(x,y)}$), or the layers may be isotropic ($n_{2(z)} = n_{2(x,y)}$).

The optical behavior and design of such multilayered stacks is described in more detail in Assignee's copending application, U.S. Ser. No. 08/402041, filed Mar. 10, 1995, and entitled "Optical Film".

In general, material A may be selected from a polymeric material, such as a naphthalene dicarboxylic acid polyester or polyethylene naphthalate (PEN) and isomers thereof (e.g., 2,6-, 1,4-, 1,5-, 2,7-, and 2,3-PEN). Material A may also be selected from other semi-crystalline polymeric materials, such as polyethylene terephthalate (PET), polyethylene isophthalate (PEI), coPEN, coPET, and copolymers of PEI. As used herein, coPEN refers to either of the following: 1) a copolymerized reaction product of a naphthalene dicarboxylic acid monomer and other suitable monomers such as isophthalic, terephthalic, or 4-4' bibenzoic acid or their esters such as dimethyl terephthalate; or 2) a transesterified extrusion blend of two or more polymers where at least one component is a homopolymer or a copolymer based on naphthalene dicarboxylic acid and other components are other polyesters or polycarbonates, such as PET. As used herein, coPET refers to a copolymer or blend based upon terephthalic acid. Material B may be a semi-crystalline or amorphous polymeric material having a relatively low x-y plane index of refraction ($n_{2(x,y)}$ less than or equal to about 1.60), such as syndiotactic polystyrene (sPS), commercially available from the Dow Chemical Company; atactic polystyrene (aPS), also available from the Dow Chemical Company; 2-polyvinylnaphthalene, polymethylmethacrylate (PMMA); glycol modified polycyclohexanedimethylene terephthalate commercially available under the trade designation Eastar from Eastman Chemical Co.; copolyester-ether copolymers commercially available under the trade designation ECDel from Eastman Chemical Co.; and polycarbonate, such as the isotropic copolycarbonate described in U.S. Pat. No. 5,278,694, example 4. Other potentially useful materials are certain isomers of PEN that may be positively uniaxially birefringent (1-4, 2-4, 1-3, 2-3, and 1-5). Materials A and B are preferably chosen to have similar rheological properties (e.g., melt viscosities) and optimum stretch temperatures such that they can be conveniently coextruded and biaxially stretched. Optimum stretch temperature is defined as the temperature at which a given material exhibits the desired amount of stress-induced birefringence. Particularly preferred combinations of materials A and B include PEN/PMMA, coPEN/sPS, PEN/polycarbonate, coPEN/polycarbonate, PET/copolyester-ether copolymer, PEN/copolyester-ether copolymer PEN/sPS, PEN/coPET, and PET/sPS.

In another embodiment, the nonpolarizing beamsplitter of this invention comprises a multilayered stack of alternating layers of materials A and B having the index of refraction relationships described above, in which the average optical thickness of the layers in the stack is less than 5/4 times the average wavelength of the light to be reflected ($5/4\lambda$). Preferably, each layer has an optical thickness of less than $5/4\lambda$. Optical thickness (nd) is defined as the index of refraction (n) multiplied by material thickness (d). A layer of material A adjacent to a layer of material B comprises a layer pair. Preferably, the average optical thickness of the layer pairs in the stack is about $\lambda/2$. The number of layer pairs in the stack will depend on the transmission:reflectance ratio desired and the bandwidth of light to be used. When the angle of incidence is varied, the reflectance bands of a multilayered thin film stack of the two materials will exhibit equal wavelength shifts for s- and p-polarized light only if Equations 3a and 3b are satisfied for materials A and B. Extremely precise and uniform layer thicknesses are required in this embodiment in order to achieve uniform reflectivity across the surface of the beamsplitter and over the designated bandwidth.

The multilayered stack of layer pairs in this embodiment is usually designed by a computer optimization routine, after suitable materials have been chosen and performance targets have been set. Computer optimization can correct potentially undesirable effects due to dispersion and intraband interference in broadband applications. Computer optimization can also be used to improve the nonpolarizing response of a stack of two materials whose indices do not exactly satisfy Equations 3a and 3b. To use computer optimization, a starting design is fed into a computer program that adjusts individual layer thicknesses to achieve the best optical response with minimum deviation from target points. Two possible approaches for starting designs include the combination stack and the graded stack. Either or both of these approaches may be incorporated into the final stack design.

In the combination stack approach, the multilayered stack includes one or more segments of layer pairs. Each segment is intended to reflect light having a particular bandwidth by including layer pairs each with a combined thickness of about one half of the center wavelength of the band of light reflected by that segment. The combination of segments having different layer pair thicknesses is intended to allow the nonpolarizing beamsplitter of this invention to exhibit a nonpolarizing response across bandwidths as large as 2000 nm.

In the graded stack approach, the multilayered stack comprises a series of adjacent layer pairs of materials A and B. The thickness of the layer pairs gradually increases through the stack along a gradient. The range of thicknesses in the stack (from the thinnest layer pair at one end to the thickest layer pair at the other end) is chosen so that the nonpolarizing beamsplitter will reflect light having a desired overall bandwidth. An example of a graded stack starting design might include about 45 layer pairs comprising PEN and sPS and having graded thickness in the range from 150 nm to 450 nm.

Figure 8:
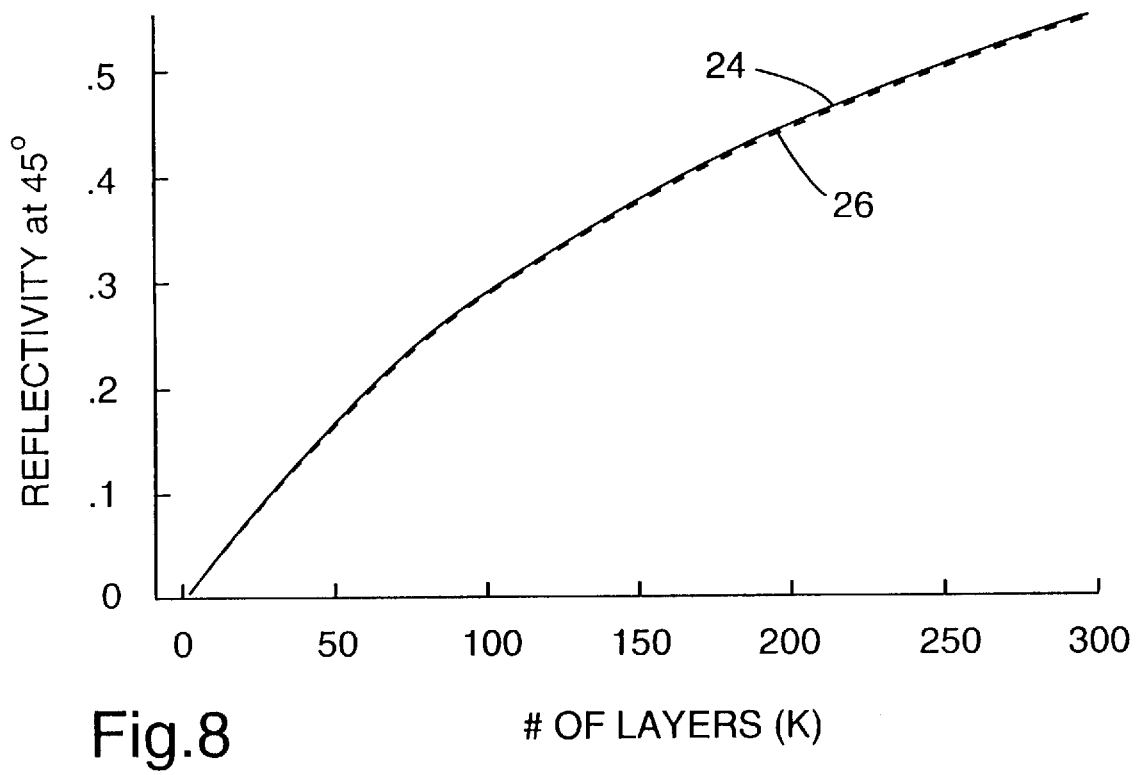
FIG. 8 is a graphical view of computed reflectivity vs. number of layers of s- and p-polarized light at θ=45° in an air medium for a multilayered stack of materials A and B having layer thicknesses greater than 5/4 λ.

In a particularly preferred embodiment, the nonpolarizing beamsplitter comprises a multilayered stack of alternating layers of materials A and B in which the average optical thickness of the layers in the stack is at least 5/4 times the average wavelength of the light to be reflected ($5/4\lambda$). Preferably, each layer has an optical thickness of at least $5/4\lambda$. This approach yields what is known as a "pile of plates" optical stack or a thick film stack. The reflectivity of such a stack is lower than for a quarter wave stack utilizing constructive interference, but the ratio of $R_s$ and $R_p$ that is reflected is determined by material properties only, and cannot be significantly affected by layer thickness. This beamsplitter therefore may be simpler and more economically feasible for manufacturing purposes. Such a stack has no wavelength selectivity. The stack has at least 10 layers, and more preferably in the range from 10 to 1000 layers. The reflectivity of the stack for a given wavelength is given by the following equation:

$$R = Kr^2/[1+(K-1)r^2] \qquad (4)$$

where K is the number of layers and r is the reflection coefficient as given by Equations 1 and 2 for p- and s-polarized light at a given wavelength, respectively. This equation is valid for any angle of incidence, provided the value of r is determined for that angle. For the purposes of illustration, the values of r were calculated for s- and p-polarized light at $\theta=45°$ in an air medium using a hypothetical material pair in which $n_{1(x,y)}=1.74$, $n_{1(z)}=1.49$, $n_{2(x,y)}=1.57$, and $n_{2(z)}=1.62$ (index values are similar to those for a PEN/sPS pair). R was calculated for a number of values of K, making the assumption that no air gaps exist between layers. As shown in FIG. 8, reflectivity curves 24 and 26 for s- and p-polarized light, respectively, appear to be nearly identical. To make a beamsplitter with reflectivity of 0.5 or greater, a stack of at least 250 layers is required. For example, a 250-layer PEN/sPS stack with individual layers of 0.5 $\mu$m material thickness would be 125 $\mu$m thick. This thickness is within the capability of most biaxial film stretching equipment. Such a stack would have layer thicknesses of at least $5/4\lambda$ for light in the 400–700 nm wavelength range. In general, thicker layers will result in reduced iridescence. If a desired stack is excessively thick for biaxial stretching, several thinner stacks having 100 layers, for example, could be individually stretched and then bonded together to achieve a similar response. In this embodiment, dispersion effects cannot be corrected by computer optimization of layer thicknesses as with a thin film optical interference stack. Instead, one can choose a stack based on the wavelength in the center of the bandwidth of interest in order to minimize deviation between $R_s$ and $R_p$ across the band. If the dispersion effects across that bandwidth are not too high, then a broadband nonpolarizing beamsplitter can be made very simply and inexpensively.

In another approach to this embodiment, all of either the material A or material B layers are thin (less than ¼ $\lambda$, preferably less than $\frac{1}{8}\lambda$) while the layers of the other material are thick (greater than $5/4\lambda$). The thin layers should be significantly less than ¼$\lambda$ for all wavelengths in the bandwidth of interest to avoid variations in reflectivity due to thickness errors. The resulting stack has alternating thin and thick layers with enhanced reflectivity. Such alternating thick-and-thin stacks are described in U.S. Pat. No. 5,122,906.

The nonpolarizing beamsplitter of this invention is prepared in one way by coextruding material A and material B to form a multilayered sheet, or cast web, and then orienting the sheet by stretching substantially in one direction at a selected temperature and stretching in a direction perpendicular to the first direction at a selected temperature, according to practices well known in the art. The stretching may optionally be followed by heat-setting at a selected temperature. Typically, the sheet is first stretched in the machine direction, as with a length orienter, and then stretched in the transverse direction, as with a tenter. Alternatively, the sheet may be simultaneously stretched in the two directions using a simultaneous biaxial stretching apparatus. The cast sheet instead may be stretched off-line in both directions simultaneously using a laboratory-scale film stretching apparatus, or the sheet may be stretched using other film stretching techniques. The pre-stretch temperature, stretch temperature, stretch rate, stretch ratio, heat set temperature, and heat set time are selected to yield a multilayered stack having the desired refractive index relationships. These variables are interdependent; thus, for example, a relatively low stretch rate could be used if coupled with a relatively low stretch temperature. It will be apparent to one of ordinary skill how to select the appropriate combination of these variables to achieve the desired multilayered stack for the materials chosen. For example, the stretch ratio for a PEN/sPS material pair is preferably in the range from 2:1 to 7:1 in either direction, and more preferably 4:1 to 6:1.

Design of a nonpolarizing beamsplitter of this invention is typically an iterative process, in which material A and material B are chosen to exhibit generally correct index of refraction relationships as described above with respect to the contour plot in FIG. 6a. A sheet of alternating layers of materials A and B is then coextruded with layer thicknesses that may have been predetermined by computer optimization and biaxially stretched. The resulting stack may be analyzed for percent transmission (T) across the desired bandwidth at several angles of incidence using a device such as a spectrophotometer. Reflectivity (R) is designated as R=1−T/100 (absorption is assumed to be negligible). If the resulting spectra reveal that the reflectivities of the s- and p-polarized components are not closely aligned in the desired range of angle of incidence, it may be necessary to adjust the stretch conditions in order to increase or decrease the relative values of $n_{1(z)}$, $n_{2(z)}$, $n_{1(x,y)}$, and $n_{2(x,y)}$.

The finished stack may be provided with an antireflective treatment on one or both major surfaces to reduce surface reflections, and the stack may be optionally attached to a transparent substrate in order to provide rigidity and durability to the nonpolarizing beamsplitter in a manner described previously.

Although biaxially stretching a coextruded multilayered sheet is a preferred method of making a nonpolarizing beamsplitter according to this invention, other methods of making a multilayered stack of uniaxially birefringent layers may also be employed. For example, growth of birefringent multilayer crystalline organic semiconductor structures comprising alternating layers of 3,4,9,10 perylenetetracarboxylic dianhydride (PTCDA) and 3,4,7,8 naphthalenetetracarboxylic dianhydride (NTCDA) is described in So, F.F., et al. "Quasi-epitaxial growth of organic multiple quantum well structures by organic molecular beam deposition," *Appl. Phys. Lett.*, 56(7), February 1990: 674–676.

The invention will be further illustrated by the examples which follow. All measurements are approximate.

EXAMPLE 1

A nonpolarizing beamsplitter of the present invention was made by extruding a cast web in one operation and later biaxially orienting the web in a laboratory-scale stretching apparatus.

A 241-layer web was coextruded using a 61-slot feedblock and two multipliers. The use of such multipliers is described in U.S. Pat. No. 3,565,985. Polyethylene naphthalate (PEN) having an intrinsic viscosity of 0.56 dl/g (in a solvent of 60:40 weight % phenol:dichlorobenzene) was delivered by one extruder at a rate of 12 kg per hour, and syndiotactic polystyrene (sPS) with a weight average molecular weight of 200,000 was delivered by another extruder at a rate of 10 kg per hour. Thick skin layers of PEN were added with equal thickness between the final multiplier and the die at a total rate of 4 kg per hour. The cast web was about 508 microns ($\mu$m) thick and 29 cm wide.

The cast web was biaxially oriented using a laboratory-scale stretching apparatus in which the four edges of a piece of web are gripped and the web is simultaneously stretched in the machine direction and the transverse direction. The sample of web was about 7.5 cm by 7.5 cm. The web sample was loaded onto the stretcher at about 100° C. and heated to 130° C. in 60 seconds. The sample was then stretched at a rate of about 10% per second to a stretch ratio of about 4.4:1 in each of the machine and transverse directions. Immediately after stretching, the sample was cooled by blowing room temperature air on it. The sample was not heat set. The resulting film had 241 layers alternating between PEN and sPS. The outer layers were very thick, but the average thickness of the 239 inside layers was about 80 nm.

Figure 9:
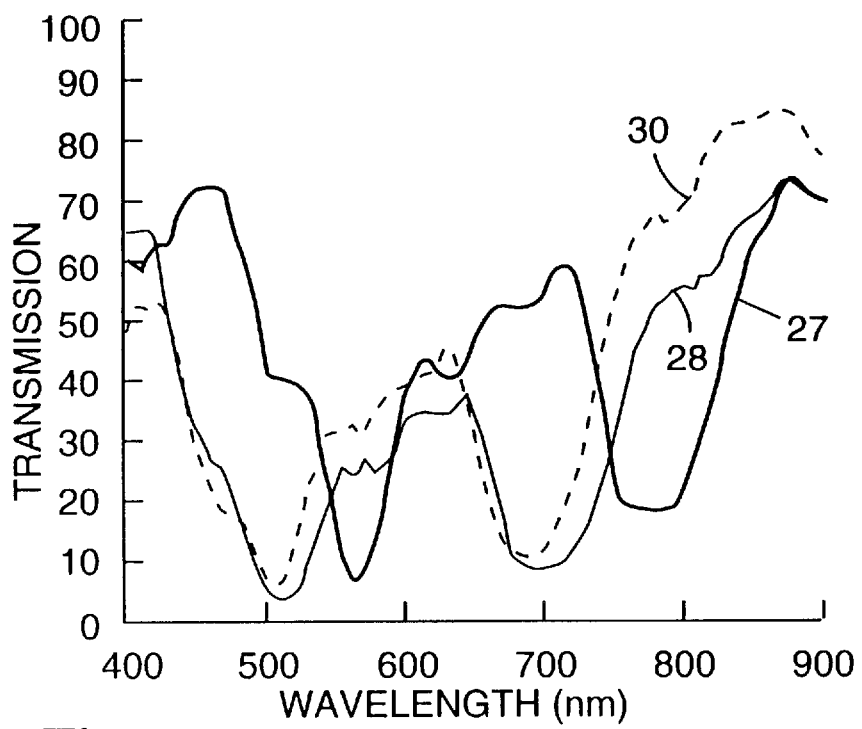
FIG. 9 is a graphical view of percent measured transmission of s- and p-polarized light at θ=45° for the 241-layer beamsplitter of Example 1.
Figure 10:
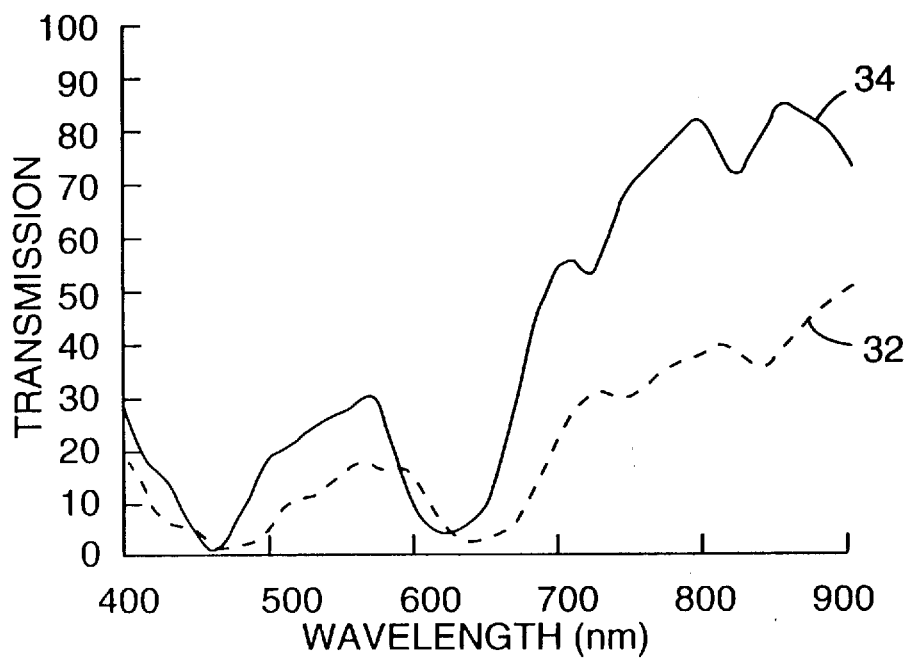
FIG. 10 is a graphical view of percent measured transmission of s- and p-polarized light at θ=70° for the 241-layer beamsplitter of Example 1.

The performance of the film was determined by percent transmission measurements of s- and p-polarized light at θ=0°, 45° and 70° in air, using a spectrophotometer in a wavelength range of 400–900 nm. θ=0° is the same as normal incidence. Results are shown in FIGS. 9 and 10. In FIG. 9, transmission of light at θ=0° is represented by line 27. Line 28 represents transmission of s-polarized light at θ=45°, while line 30 represents transmission of p-polarized light at θ=45°. Data at 70° angle of incidence are shown in FIG. 10, by line 34 for p-polarized light, and by line 32 for s-polarized light. Several spectral features are evident in the data. Reflectance peaks for p-polarized light shift to the blue more so than the peaks for s-polarized light, as the angle of incidence increases. The breadth of the s-polarized light peaks increases more than those for p-polarized light. In general, the transmission decreases more with angle for s-polarized light than for p-polarized light. Decreased breadth of peaks and higher transmission for p-polarized light imply that the reflection coefficient $r_{pp}$ of Equation 1 does not increase as rapidly with θ as does $r_{ss}$ from Equation 2. We believe that, for the beamsplitter made in this example, the cast web was not stretched with the proper conditions to provide optimum birefringence of the layers. As a result, it is possible that $n_{1(z)}$ was not quite low enough to yield equal reflectivity for s and p polarizations at either θ=45° or θ=70°. It is anticipated that further optimization of the stretch ratio, stretch temperature and/or heat setting the stretched stack would improve the reflectivity match.

The larger blue shift of the peaks for p-polarized light seen in FIGS. 9 and 10 is due to the lower birefringence of the sPS material compared to the PEN material. Only equal and opposite values of birefringence in the two materials will produce nearly equal wavelength shifts for the spectra of s- and p-polarized light.

We claim:

1. A nonpolarizing beamsplitter, comprising a multilayered stack having two major surfaces, the multilayered stack comprising alternating layers of a first material and a second material, wherein each of the layers has an x-direction and a y-direction forming an x-y plane, and a z-direction perpendicular to the x-y plane, wherein the first material layers have an index of refraction in the x-y plane, $n_{1(x,y)}$ and an index of refraction in the z-direction $n_{1(z)}$, wherein the first material layers are uniaxially birefringent such that $n_{1(x,y)} - n_{1(z)} \geq 0.05$, wherein the second material layers have an index of refraction in the x-y plane, $n_{2(x,y)}$, and an index of refraction in the z-direction, $n_{2(z)}$, wherein $n_{1(x,y)} > n_{2(x,y)}$ and $n_{1(z)} \leq n_{2(z)}$, such that for an incident beam of light striking a major surface of the beamsplitter at any angle of incidence θ within a range of angle of incidence, the incident beam having a useful bandwidth, a p-polarized component and an s-polarized component, the beamsplitter exhibits an average reflectivity $R_p$ for the p-polarized component of the incident beam and an average reflectivity $R_s$ for the s-polarized component of the incident beam, wherein $R_p$ and $R_s$ differ by less than 25%.

2. The beamsplitter of claim 1, wherein $R_p$ and $R_s$ differ by less than 10%.

3. The beamsplitter of claim 1, wherein $R_p$ and $R_s$ differ by less than 5%.

4. The beamsplitter of claim 1, wherein the bandwidth of the incident beam has a size of at least about 25 nm.

5. The beamsplitter of claim 4, wherein the bandwidth of the incident beam has a size in the range from 100 to 400 nm.

6. The beamsplitter of claim 1, wherein the range of angle of incidence has a size of at least 15°.

7. The beamsplitter of claim 6, wherein 30°<θ<60°.

8. The beamsplitter of claim 6, wherein 0°<θ<75°.

9. The beamsplitter of claim 1, wherein the bandwidth of the incident beam extends from about 400 to about 700 nm and the range of angle of incidence has a size between 15° and 25°.

10. The beamsplitter of claim 1, further comprising a transparent substrate, wherein the multilayered stack is mounted on the substrate.

11. The beamsplitter of claim 1, further comprising an antireflective treatment on at least one major surface of the multilayered stack.

12. The beamsplitter of claim 1, wherein the first material is a polymer exhibiting positive stress-induced birefringence and the stack has been biaxially stretched in the x-direction and the y-direction.

13. The beamsplitter of claim 12, wherein the second material is an isotropic polymer.

14. The beamsplitter of claim 12, wherein the second material is a polymer exhibiting stress-induced birefringence.

15. The beamsplitter of claim 12, wherein the first material comprises a polymer selected from the group consisting of polyethylene napthalate; polyethylene terepthalate; polyethylene isopthalate; copolymers comprising a napthalene dicarboxylic acid monomer and a second monomer compatible therewith; polymer blends, wherein at least one polymer in the blend is a polymer derived from a napthalene carboxylic acid and a second polymer in the blend is selected from the group consisting of polyesters and polycarbonates; copolymers comprising polyethylene terepthalate; polymer blends comprising polyethylene terepthalate; and copolymers comprising polyethylene isopthalate.

16. The beamsplitter of claim 14, wherein the second material comprises a polymer selected from the group consisting of syndiotactic polystyrene, polymethylmethacrylate, polycarbonate, copolycarbonate, atactic polystyrene, copolyester-ether copolymers, glycol-modified polycyclohexanedimethylene terepthalate and 2-polyvinylnaphthalene.

17. The beamsplitter of claim 14, wherein the first material comprises polyethylene napthalate and the second material comprises syndiotactic polystyrene.

18. The beamsplitter of claim 1, wherein the difference between $n_{1(x,y)}$ and $n_{2(x,y)}$, $\Delta n_{(x,y)}$, is at least 0.05.

19. The beamsplitter of claim 1, wherein $n_{1(x,y)} = n_{2(z)}$ and $n_{2(x,y)} = n_{1(z)}$.

20. The beamsplitter of claim 1, wherein the average of the optical thicknesses of the layers is less than 5/4 λ.

21. The beamsplitter of claim 1, wherein each layer has an optical thickness of less than 5/4 λ.

22. The beamsplitter of claim 1, wherein the average of the optical thicknesses of the layers is at least 5/4 λ.

23. The beamsplitter of claim 1, wherein each layer has an optical thickness of at least 5/4 λ.

24. The beamsplitter of claim 23 wherein the stack comprises at least 10 layers.

25. A nonpolarizing beamsplitter, comprising a multilayered stack having two major surfaces, the multilayered stack comprising alternating layers of polyethylene napthalate and syndiotactic polystyrene, wherein each layer has a thickness of at least 5/4λ, wherein each of the layers has an x-direction and a y-direction forming an x-y plane, and a z-direction perpendicular to the x-y plane, wherein the polyethylene napthalate layers have an index of refraction in the x-y plane, $n_{1(x,y)}$, in the range from about 1.73 to about 1.77 and an index of refraction in the z-direction, $n_{1(z)}$, in the range from about 1.48 to about 1.52, wherein the syndiotactic polystyrene layers have an index of refraction in the x-y plane, $n_{2(x,y)}$, in the range from about 1.55 to about 1.59 and an index of refraction in the z-direction, $n_{2(z)}$, in the range from about 1.60 to about 1.64, wherein the indices of refraction are measured at 580 nm, such that for an incident beam of light striking a major surface of the beamsplitter at any angle of incidence θ in the range extending from about 0° to about 60°, the incident beam having a useful bandwidth, a p-polarized component and an s-polarized component, the beamsplitter exhibits an average reflectivity $R_p$ for the p-polarized component of the incident beam and an average reflectivity $R_s$ for the s-polarized component of the incident beam, wherein $R_p$ and $R_s$ differ by less than 10%.

26. A method of making a nonpolarizing beamsplitter, comprising:
    coextruding a multilayered sheet of alternating layers of a first material and a second material, wherein each of the layers has an x-direction and a y-direction forming an x-y plane, and a z-direction perpendicular to the x-y plane, wherein the first material layers have an index of refraction in the x-y plane, $n_{1(x,y)}$, and an index of refraction in the z-direction, $n_{1(z)}$, and the second material layers have an index of refraction in the x-y plane, $n_{2(x,y)}$, and an index of refraction in the z-direction, $n_{2(z)}$, wherein the first material exhibits positive stress-induced birefringence; and
    biaxially stretching the sheet in the x-direction and the y-direction until a multilayered stack having two major surfaces is formed, wherein the first material layers are uniaxially birefringent such that $n_{1(x,y)} - n_{1(z)} \geq 0.05$, wherein $n_{1(x,y)} > n_{2(x,y)}$ and $n_{1(z)} \leq n_{2(z)}$, such that for an incident beam striking a major surface of the stretched multilayered stack at any angle of incidence θ within a range of angle of incidence, the incident beam having a useful bandwidth, a p-polarized component and an s-polarized component, the beamsplitter exhibits an average reflectivity $R_p$ for the p-polarized component of the incident beam and an average reflectivity $R_s$ for the s-polarized component of the incident beam, wherein $R_p$ and $R_s$ differ by less than 25%.

27. The method of claim 26, wherein $R_p$ and $R_s$ differ by less than 10%.

28. The method of claim 26, wherein $R_p$ and $R_s$ differ by less than 5%.

29. The method of claim 26, wherein the bandwidth of the incident beam has a size of at least about 25 nm.

30. The method of claim 29, wherein the bandwidth of the incident beam has a size in the range from 100 to 400 nm.

31. The method of claim 26, wherein 30°<θ<60°.

32. The method of claim 26, wherein 0°<θ<75°.

33. The method of claim 26, wherein the bandwidth of the incident beam extends from about 400 to about 700 nm and the range of angle of incidence has a size between 15° to 25°.

34. The method of claim 26, wherein $n_{1(x,y)} = n_{2(z)}$ and $n_{2(x,y)} = n_{1(z)}$.

35. A nonpolarizing beamsplitter, comprising a multilayered stack having two major surfaces, the multilayered stack comprising alternating layers of a first material and a second material, wherein each of the layers has an x-direction and a y-direction forming an x-y plane, and a z-direction perpendicular to the x-y plane, wherein the first material layers have an index of refraction in the x-y plane, $n_{1(x,y)}$ and an index of refraction in the z-direction $n_{1(z)}$, wherein the first material layers are uniaxially birefringent such that $n_{1(x,y)} - n_{1(z)} = 0.05$, wherein the second material layers have an index of refraction in the x-y plane, $n_{2(x,y)}$, and an index of refraction in the z-direction, $n_{2(z)}$, wherein $n_{1(x,y)} > n_{2(x,y)}$, and $n_{1(z)} < n_{2(z)}$, such that an incident beam of light, striking a major surface of the multilayered stack at any angle of incidence θ within a range of angles from 0° to 70° in air, and having a p-polarized component and an s-polarized component, exhibits a reflectivity $R_p$ for the p-polarized component of the incident beam and a reflectivity $R_s$ for the s-polarized component of the incident beam at each interface of the first and the second material which differ by less than 25% for each angle of incidence within the range.

* * * * *